March 11, 1969     C. J. GREEN     3,431,742
GENERATION OF COOL WORKING FLUIDS

Filed Jan. 9, 1967

INVENTOR.
CHARLES J. GREEN
BY *Graybeal, Cole & Barnard*
ATTORNEYS

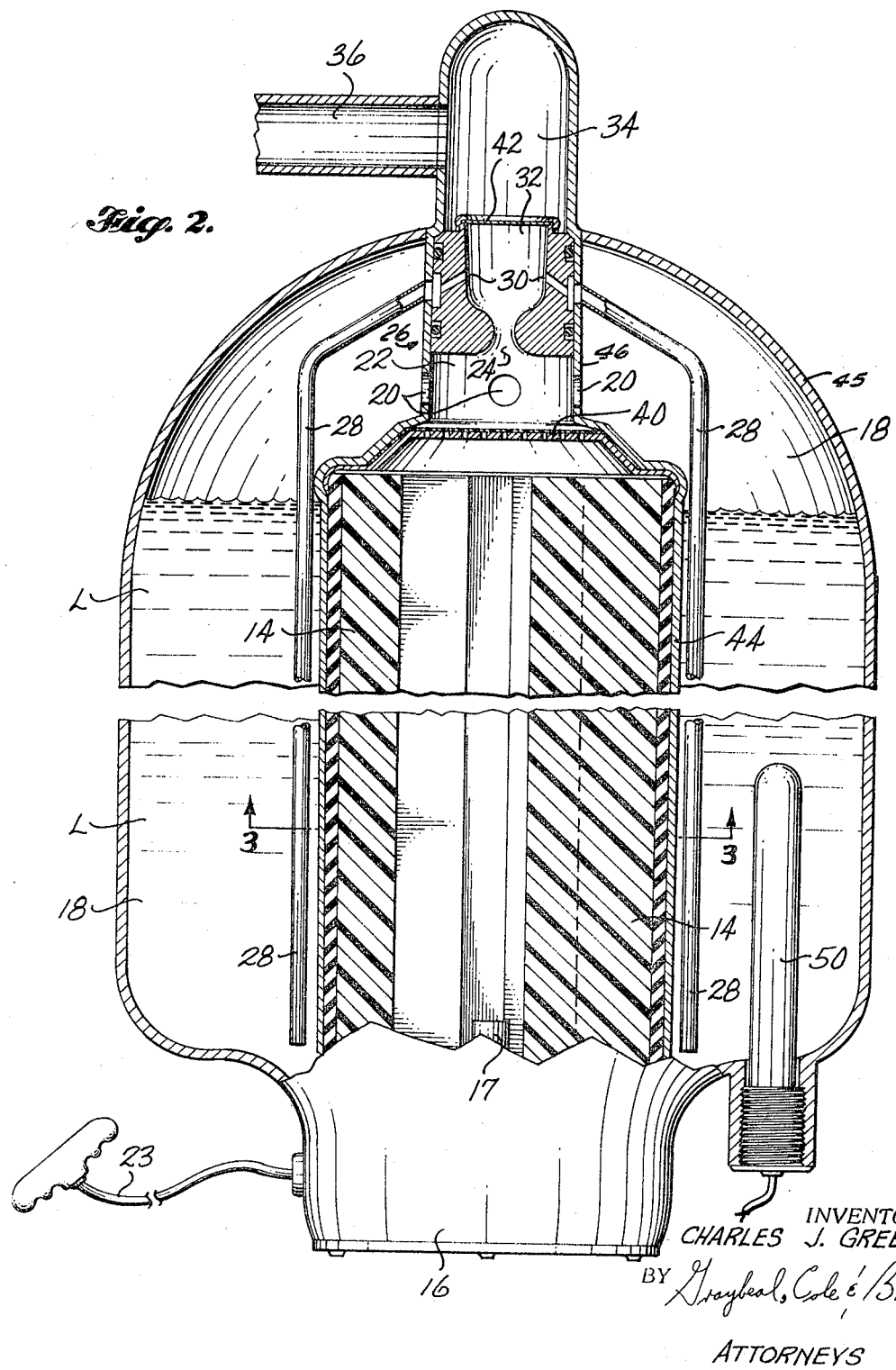

United States Patent Office 3,431,742
Patented Mar. 11, 1969

3,431,742
GENERATION OF COOL WORKING FLUIDS
Charles J. Green, Vashon Island, Wash., assignor to Rocket Research Corp., Seattle, Wash., a corporation of Washington
Filed Jan. 9, 1967, Ser. No. 608,152
U.S. Cl. 62—52    37 Claims
Int. Cl. F17c 7/02; F02c 3/12

ABSTRACT OF THE DISCLOSURE (1) Generating a cool working fluid by generating hot gases under pressure (by combustion or catalytic decomposition of a fuel, or by a bipropellant reaction) using a portion of such gases to pressure feed a liquified gas from its storage chamber into a mixing chamber, delivering the remainder of the hot gases into the mixing chamber, delaying the hot gases and the liquid in the mixing chamber long enough for the hot gases to provide the heat of vaporization for, and cause the vaporization of the liquid; (2) using as the liquid water or liquified air, liquified carbon dioxide, or a liquified, fluorinated hydrocarbon type refrigerant (e.g. Freon 22); (3) preheating the fuel and liquid to minimize problems associated with variations in ambient temperature; (4) regulating the temperature, pressure and flow rate of the generated fluid by choice of hot gas generation rate; (5) controlling the hot gas generation to cause a progressive increase in pressure of the generated fluid; and (6) entraining ambient air into the generated fluid and using the resulting mixture for inflating bags, life rafts, escape slides, etc.

BACKGROUND OF THE INVENTION

Field of the invention

The present invention relates primarily to the generation of a relatively low temperature working fluid or gaseous mixture under pressure. It relates more to the handling and combining of the substances which produce the working fluid than to the handling or dispensing of the working fluid after it has been generated. The cool gas generating procedure involves the generation of hot gases, the pumping of a liquid, which may be a liquified gas, preferably by means of the hot gases, and the mixing of said liquid and said hot gases to cause vaporization of said liquid, by means of the heat furnished by the hot gases. It also involves generating the hot gases by burning a fuel and controlling the pressure and delivery rate of the system's effluent by choice of the hot gas generation rate.

Description of the prior art

Known gas generators which involve mixing combustion products and a coolant are disclosed by Goddard 2,522,113; Scholz 2,530,633; Maurice 2,779,281; Volk, Jr. 2,994,194, and also by Hebenstreit 3,117,424, Hebenstreit et al. 3,122,181; Hebenstreit 3,143,445; Wismar 3,163,014; Hebenstreit 3,180,373; Hebenstreit 3,232,481; and Wismar 3,269,310. Each of this latter group of patents involves a system wherein the combustion products and the liquified gas are mixed together in the storage chamber for the liquified gas, and the resulting mixture, which is *gaseous,* is then released or withdrawn from such storage chamber.

Wismar 3,163,014 discloses a process comprising: generating hot combustion gases and initially directing *all* of such gases into a chamber containing liquified carbon dioxide. Such chamber is initially closed by a blowout element. When the pressure in said container exceeds the burst pressure of the blowout element, such element is ruptured, and the outlet is opened. The remaining combustion gases then serve to aspirate the mixture of gases from the carbon dioxide storage chamber.

Hebenstreit et al. 3,122,181 discloses entraining ambient air in a working fluid constituting a mixture of combustion gases and carbon dioxide, and then introducing the final mixture into an inflatable device.

SUMMARY OF THE INVENTION

The subject invention primarily relates to a method and apparatus for rapidly removing a preferably nonflammable *liquid* from its storage chamber, and then rapidly vaporizing such liquid concurrently with its removal to produce a relatively cool gaseous working fluid, and particularly such a fluid that is suitable for use in inflating inflatable structures such as aircraft escape slides, for example.

According to the basic technique of the invention, hot gases under pressure are generated, such as by burning a fuel in a first confined zone; a portion of the hot gases are introduced into a second confined zone, or storage chamber, containing a liquid, for pressure feeding the liquid into a third confined zone; the remainder of said hot gases released into the third confined zone concurrently with the liquid; and the hot gases and liquid are delayed in said third confined zone a sufficient time to allow the said hot gases to provide the heat of vaporization for, and cause the vaporization of, at least most of the liquid, during the delay time of said fluids in the third confined zone; the resulting fluid mixtures is formed into a stream; and such stream is delivered to a utilization device.

Preferably, the hot gases are generated by burning a solid fuel grain in a confined zone. The various chambers and passageways are of a fixed size, and no mechanical regulators are employed. The pumping and vaporization rate of the liquid, and the temperature, pressure, and delivery rates of the final fluid mixture, are dependent on the hot gas generation rate of the fuel. The hot gas generation rate of the fuel is selected by constructing the grain to expose only a predetermined area of burning surface during each stage of combustion. The grain may be constructed to produce gases at a substantially constant rate, so that the reference pressure on the confined liquid, the flow rate of the hot gases, and the heat supply rate of such gases remain substantially constant. In a system such as disclosed by Hebenstreit et al. 3,122,181, the system effluent undergoes a decay in pressure because the coolant is fully vaporized in its storage chamber. As fluid leaves the chamber the pressure in it progressively drops.

According to the present invention, the grain may be constructed for progressive combustion, so that there is a progressive increase in the generation rate of the hot gases, and in turn a progressive increase in the pumping rate of the liquid and the flow rate of the system effluent. It is particularly advantageous to construct the fuel grain for progressive combustion when the system effluent is to be used as an inflating gas. This is because the inflatable object is a closed chamber and as it proceeds towards an inflated condition the gases contained therein exert a back pressure tending to resist introduction of additional gases into the object. Progressive combustion of the fuel results in a progressive increase in the pressure of the system effluent, whereby inflation of the object can proceed in spite of the back pressure, because the pressure of the new gases rises with the back pressure and is always at a sufficiently higher value, resulting in the establishment of a satisfactory inflow rate.

A principal difference between the cool gas generating technique of this invention and the techniques disclosed by Hebenstreit 3,117,424; Hebenstreit et al. 3,122,181; Hebenstreit 3,143,445; Wismar 3,163,014; Hebenstreit 3,180,-

373; Hebenstreit 3,232,481; and Wismar 3,269,310 is that under the present invention the coolant always leaves its storage chamber in the *liquid* state, i.e., there is no mixing of the hot gases and liquid in the storage chamber for the latter. As a result, the flow rate of the coolant from its container is always closely dependent on, and is determinable by, the flow rate of the hot gases. Any change in the flow rate of the hot gases, caused by a change in the generation rate of hot gases, causes a proportional change in the flow rate of the liquid, which change is relatively accurately predictable.

Another aspect of this invention comprises stabilizing the burning rate of the fuel and the flow rate of the fluids, when the process is carried out in a relatively low ambient temperature environment, by preheating the fuel and the liquid, and preferably also some of the fluid handling equipment.

A cool gas generator according to the present invention may comprises a hot gas generating chamber including an outlet passageway; a storage chamber containing a liquid to be vaporized; a jet pump having a pumping fluid inlet, a pumped fluid inlet, and a combined fluid outlet, means defining a first hot gas passageway leading from the outlet passageway of said hot gas generating chamber into an upper portion of said storage chamber; means defining a liquid passageway leading from a lower portion of said storage chamber to the pumped fluid inlet of said jet pump; means defining a second hot gas passageway leading from the outlet passageway of said gas generator to the pumping fluid inlet of said jet pump; and a combined fluid detaining and mixing chamber having an inlet in fluid receiving communication with the outlet of said jet pump, and an outlet nozzle. The hot gas generating chamber may contain a solid fuel grain and include an initiator for such grain. The storage chamber may be a pressure vessel and the liquid a liquefied gas. A first blowout element may be used to initially close and seal the outlet of the hot gas generating chamber, and a second blowout element may be provided to initially close and seal the outlet of the jet pump.

Also according to the invention, the hot gas generating chamber may be defined by a first casing, and a second and larger casing may surround said first casing, with the space formed between the two casings constituting the storage chamber for the liquid. The outlet passageway of the hot gas generating chamber may be located near one end of the storage chamber, and the means defining the first hot gas passageway may constitute one or more orifices in the wall of said outlet passageway, communicating the interior of such passageway with the proximal end portion of the storage chamber. The means defining the liquid passageway may constitute at least one tube extending from the end of said storage chamber distal the orifice to the pumped fluid inlet of the jet pump.

When the system is to be used in a relatively low temperature environment, a heater means may be provided for heating both the fuel grain and the nonflammable liquid prior to combustion, to raise their temperature to a predetermined value above ambient temperature. The heater means may comprise an immersion heater element immersed in the liquid, for directly heating same, with the liquid in turn heating the hot gas generating chamber and the fuel grain therein.

According to the present invention, the output pressure and delivery rate of the system effluent is controlled solely by selection of the burning rate of the fuel. No mechanical regulator is involved; flow control is completely fluidic.

Another principal aspect of the present invention is the utilization (as the liquid) of a liquified fluorinated hydro-refrigerant, such as Freon 22 or Carrene-500, for example. These substances have relatively low molecular weights, and undergo relatively large changes in volume from gas to liquid and from liquid to gas. Also, they are stable and have relatively low vapor pressures. As a result of the relatively low vapor pressure, during periods of storage leakage of fluid is no great problem, and there is little likelihood of an explosion.

Although the vapor pressure is relatively low, it is not too low for satisfactory use of the working fluid as an inflating gas. A too low of vapor pressure, such as possessed by water, for example, would result in condensation of the gases when cooled to ambient temperature.

The operating pressure of a system using these liquids is also low, making necessary the use of only a relatively light weight envelope structure for containing the liquid. Consequently, the entire system is lighter in weight than comparable systems in which a high vapor pressure liquid, such as liquified carbon dioxide, for example, is used. Importantly also, fluorinated hydrocarbons are chosen which will remain in the liquid state throughout the temperature range of about $-65°$ F. to about $+160°$ F., which covers the anticipated operation range. This results in the pumping problem always being a *liquid* pumping problem, and the cool gas production rate always being a predictable function of the hot gas generation rate.

These and other objects, features and advantages of the present invention will be apparent from the following description, appended claims and annexed drawings.

BRIEF DESCRIPTION OF THE DRAWING

Referring to the drawing wherein like reference characters designate like parts throughout the several views;

FIG. 2 is a longitudinal sectional view of a typical embodiment of a cool gas generator constructed according to the invention, and comprising a fuel grain constructed for substantially constant combustion area exposure;

DETAILED DESCRIPTION

Figure 1:
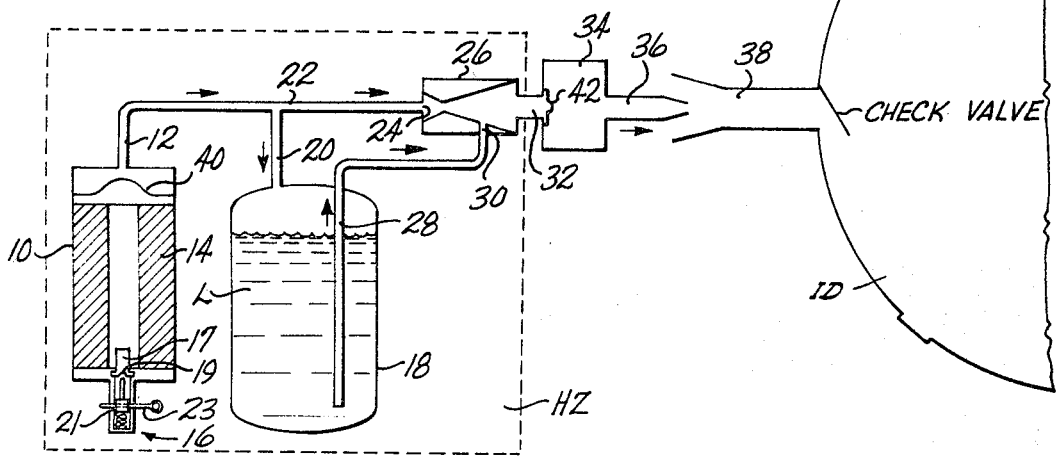
FIG. 1 is a schematic view of a cool gas generating system typifying the principles of the present invention and adapted to article inflation.

Referring to FIGS. 1 and 2 in greater detail, the system is shown to include a hot gas generating chamber 10 including an outlet 12, and containing a solid fuel grain 14.

A suitable initiator 16 is provided for initiating combustion. It is shown to comprise a pyrotechnic device 17, of shell form and including a percussion cap 19; a spring loaded firing pin 21; and a release pin 23.

The liquid coolant L (e.g. liquified Freon 22) is stored under pressure, and always in the liquid state, in a storage chamber 18. A first hot gas passageway means 20 communicates the outlet 12 of hot gas generator 10 with the space in chamber 18 above the liquid L. A second hot gas passageway 22 communicates outlet 12 with a pumping fluid inlet 24 of an aspirator 26. A pumped fluid passageway means 28 extends from a location near the bottom of chamber 18 to a pumped fluid inlet 30 of the aspirator 26. The outlet 32 of the aspirator 26 delivers the aspirator effluent into a combined fluid detaining and mixing chamber 34.

In some installations the mixing chamber outlet 36 may constitute the outlet of the system. In the inflating gas system of FIG. 1, the mixing chamber outlet 36 is schematically shown to discharge into an air ejector pump 38, and the air injector is arranged to discharge into a balloon like inflatable device ID (such as an inflatable aircraft slide, for example). The inflatable device ID is preferably provided with a check valve in its inlet.

Prior to operation a first blowout element 40 or the like seals the outlet 12 of the hot gas generating chamber 10. A second blowout element 42 or the like seals the outlet of aspirator 26. These blowout elements serve to prevent leakage of liquid L from its chamber 18 through passageway 20 and outlet 12 into contact with the fuel grain 14 in chamber 10, and through passageways 20, 22 or 28, the aspirator 26, the mixing chamber 34 and then out through the outlet 36.

As shown by FIG. 2, chamber 10 may be defined by an inner casing 44 which is centrally located inside of a substantially larger casing 45, with the annular chamber formed between the two casings 44, 45, constituting the liquid storage chamber 18. Hot gas passageway 22 may be the inner portion of a tubular chamber 46 interconnected between the outlet 12 of casing 44 (and chamber 10) and the inlet of the mixing chamber 34, and the aspirator 26 may be housed within the outer portion of tubular chamber 46. The first hot gas passageway 20 may comprise one or more orifices 20 provided in the wall of the inner portion of chamber 46.

As clearly shown by FIG. 2, the orifices 20 communicate the interior of chamber 46 with the proximal end portion of the liquid storage chamber 18. According to the invention, the liquid passageway means 28 may constitute at least one tube 28 extending from the end of chamber 18 distal the aspirator outlet 32 to the pumped fluid inlet means 30 for the aspirator 26.

In operation, the fuel grain 14 is initiated by removing pin 21. This frees the compression spring enabling it to push firing pin 21 against cap 19. Cap 19 discharges the pyrotechnic device 17, and it in turn initiates combustion on all walls of the central opening in the grain 14. As combustion proceeds the hot gases which are generated collect in the chamber 10 until the pressure buildup is sufficient to burst the closure element 40. Then, the hot gases flow out from the chamber 10, with a first portion of them flowing through passageway(s) 20 into chamber 18 above the liquid L. In this manner the combustion chamber pressure is established as a reference pressure on the liquid L.

The remaining hot gases constitute the primary (i.e. the aspirating or pumping) fluid for the aspirator 26. It enters the pumping fluid inlet 24 of the aspirator 26, exerts a bursting force on closure element 42, and then flows into the mixing chamber 34. As the primary fluid stream flows across the inlet(s) 30, it causes a pressure reduction at such point(s) and a jet pumping or aspiration of liquid L from chamber 18. The effluent of the aspirator, composed of the hot gases from inlet 24 and the liquid from inlet(s) 30, enters the mixing chamber 34, and is delayed therein because of the restricted nature of its outlet 36. In the mixing chamber 34 the hot gases and liquid are mixed, and there is a transfer of heat from the hot gases to the liquid, causing vaporization of the liquid. This is accompanied by a cooling of the hot gases. The mixture of vaporized liquid and cooled hot gases leaves chamber 34 as a stream via outlet nozzle 36.

The various orifices and passageways 12, 20, 22, 24, 28, 30, 32, 34, 36 are sized and the hot gas generation rates are such, that just enough heat is supplied by the primary fluid stream to vaporize all of the liquid with which it is comingled, and within the time it is delayed in the mixing chamber 34. The excess heat (if any) in the primary hot gas stream exits only in the amount necessary to raise the temperature of the mixture to a predetermined desired value, which in inflating gas systems is at or near ambient temperature. In such systems the relationship of the temperature of the gases injected into the inflatable object to ambient temperature should be such that substantially no volume change (particularly contraction) occurs as the inflating gas changes in temperature to ambient temperature. In systems which include an air ejector pump 38, the cooling effect of the entrained air is taken into consideration.

In gas generators which are to be carried by aircraft, to be used for inflating escape slides and life rafts, it is important that the equipment be as small in size and as light in weight as possible. Thus, such systems are provided with a solid fuel burning hot gas generator which is characterized by compactness and a relatively light weight. By way of typical example, the fuel grain may be an ammonium nitrate type propellant termed OMAX 453D, which is manufactured by the Olin Mathiesen Chemical Corporation.

In other installations, such as in a gas generator for a starting system of the type disclosed by Volk, Jr., 2,994,194, for example, other types of fuels may be used. A hydrocarbon fuel may be burned with ordinary air, or with a liquid oxidizer. Hypergolic bipropellants, flameless bireactants, and monopropellants (e.g., hydrazine) which decompose in the presence of a catalyst, are further examples of fuels or substances which may be used to produce the hot gases.

To better illustrate the significant features of the process of this invention, the following example involving the rapid vaporization of Freon 22 is presented:

EXAMPLE

The equipment used comprised a reaction chamber, a storage chamber containing Freon 22, a mixing chamber with an outlet, a first hot gas passageway leading from the reaction chamber into the storage chamber, a second hot gas passageway leading from the reaction chamber into the mixing chamber, and a liquid passageway leading from the storage chamber into the mixing chamber.

Hot gases produced by decomposing hydrazine in the reaction chambers were used to simulataneously pressurize liquid Freon 22 in its storage chamber (to reaction chamber pressure), and to mix with, heat, and vaporize the Freon 22 delivered to the mixing chamber. The mixing chamber was packed with steel wool to cause turbulent flow and promote more even gas mixing. Choking orifices of different sizes were tried at the mixing chamber's inlets and outlets, for the purpose of changing the flow rates and mixing chamber pressure. Four 20 second duration tests were completed. The reaction chamber pressure and the Freon 22 storage chamber pressure were maintained at 590±10 p.s.i.g. throughout the test. The hydrazine flow rate into the reaction chamber averaged 0.018 pound per second, and the Freon 22 averaged 0.15 pound per second, giving a mixing chamber pressure of 190 p.s.i.g. at a typical exhaust gas temperature of 57° F.

The preferred liquid L in an inflating gas system is a fluorinated hydrocarbon type refrigerant (e.g. Freon 22) capable of being maintained in liquid form throughout an ambient temperature range about −65° F. to +160° F., when pressurized by the hot gases. Maintenance of the liquid state is important because it results in a substantially uniform flow rate through the fixed orifices and passageways. Carbon dioxide is satisfactory at low temperatures, but becomes a vapor at elevated temperatures and hence is subject to choked flow.

In other installations, liquified air, liquified carbon dioxide, water, and refrigerant type fluids in general may be used depending on the intended use of the generated working fluid. With some liquids having high vapor pressures it may be necessary to replace burst element 40 with a pressure responsive valve which is constructed to open when the pressure in the hot gas generator 10 reaches the desired level.

The mixing chamber 34 is intended to provide a uniform gaseous mixture of solid fuel combustion products and vaporized liquid. To assure proper mixing and heat exchange it may be necessary to provide the mixing chamber with vanes, baffles or other means for causing turbulence in the fluid.

According to the invention, when the system is used in a low ambient temperature environment, the fuel grain 14, the liquid L, and preferably the fluid handling components upstream of the mixing chamber inlet are preheated. As shown by FIG. 2, an immersion type heater 50 may be arranged to extend into the body of liquid L in chamber 18, for directly heating the liquid L, with the liquid L in turn heating the casing 44 and the fuel grain 14 therein, the liquid fluid passageways 28, and the duct 46 and the aspirator components therein. The heater may be turned on by an integral thermostatic switch when system temperature falls significantly below a selected temperature, e.g., 60° F. By allowing the system to function always at a somewhat constant temperature, not below the selected temperature, the burning rate of the fuel is more nearly constant, no internal condensation problem exists, and flow variations are minimized. Also, by using a heater, for any particular solid fuel cartridge the quantity of liquid may be increased to provide increased capacity, and at the same time improve the cooldown pressure drop.

Figure 4:
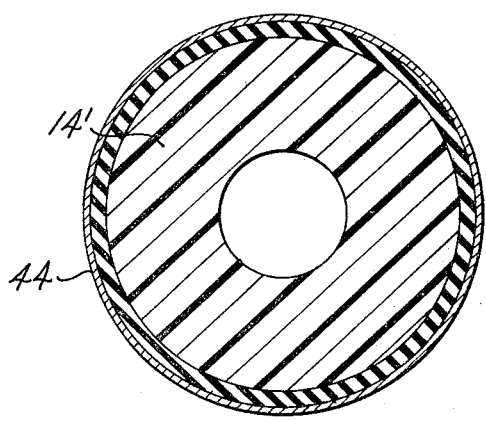
FIG. 4 is a cross-sectional view of a fuel grain that is constructed for progressive burning, viz. a progressive increase in exposed combustion area.

In some installations (e.g. an inflating gas system) it may be desirable for the pressure of the working fluid to progressively rise during operation of the system. According to the invention, this may be simply done by merely progressively increasing the hot gas generation rate. In a solid fuel system this may be done by constructing the fuel grain to progressively expose more and more burning surface as combustion proceeds. By way of typical and therefore nonlimitative example, such a grain configuration is illustrated by FIG. 4. The grain 14' is shown to have a center opening that is circular in cross section. The cylindrical wall of such opening forms the burning surface. As burning progresses the diameter of the opening and the surface area of such wall increase.

Figure 3:
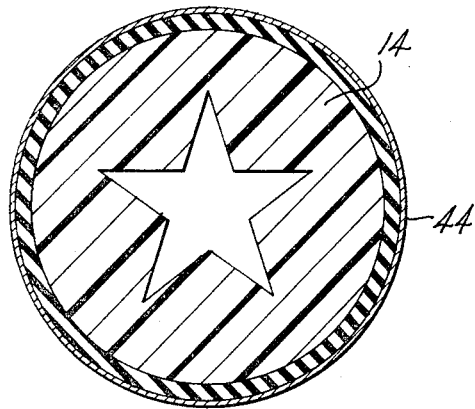
FIG. 3 is a cross-sectional view of the fuel grain of FIG. 2.

The star shaped opening in grain 14 (FIG. 2) results in a substantially uniform burning area exposure rate. As will be evident, center opening configurations which are between the opening configuration of FIGS. 3 and 4 will produce burning area exposure rates which are intermediate the area exposure rates of the grains of FIGS. 3 and 4.

Having thus described the invention it is clear that the objects as stated have been obtained in a simple and practical manner. Although the cool gas generator of the present invention has been specifically disclosed as part of a system for generating an inflating gas, it is to be understood that it has general utility and may be used in other installations requiring a relatively low temperature working fluid. By way of example, it may be used for operating turbines, or for inflating means used for raising sunken ships or other objects. While a particular embodiment of the generator has been shown and described, it is understood that changes may be made in the construction and the arrangement of various parts thereof without departing from the spirit and scope of the invention as expressed in the following claims.

What is claimed is:
1. A method of rapidly inflating a gas confining type inflatable object comprising, substantially concurrently:
 introducing a flowing cold liquid and flowing hot gases into a flow-through type mixing chamber;
 delaying such flowing fluids in said chamber a sufficient length of time to allow the hot gases to provide the heat of vaporization for, and cause vaporization of, at least most of the liquid, to form a flowing gaseous stream which is predominantly vaporized liquid, and which experiences no substantial pressure drop;
 continuously entraining ambient air into said stream; and
 continuously delivering the resulting mixture into a gas confining type inflatable object.

2. The method of claim 1, wherein said liquid is a pressure liquefied gas at least principally comprising a fluorinated hydrocarbon type refrigerant.

3. The method of claim 2, wherein said fluorinated hydrocarbon is Freon 22.

4. The method of rapidly inflating a gas confining type inflatable object comprising, substantially concurrently:
 delivering a pressure liquefied refrigerant gas at least principally comprising a fluorinated hydrocarbon type refrigerant as a liquid into a flow-through type detaining and mixing chamber;
 delivering hot gases into said detaining and mixing chamber, for mixing with said liquefied gas;
 delaying such flowing fluids in said detaining and mixing chamber a sufficient length of time to allow the said hot gases to vaporize substantially all of the liquid in such mixing chamber and provide a gaseous effluent therefrom;
 introducing the gaseous effluent into a gas confining type inflatable object; and
 proportioning the hot gases and the liquefied refrigerant gas so that the gaseous mixture in the inflatable object is approximately at ambient temperature.

5. The method of claim 4, comprising generating said hot gases by controlled burning of an ammonium nitrate type solid fuel grain in a confined zone.

6. The method of rapidly inflating a gas confining type inflatable device comprising, substantially concurrently:
 generating hot gases under pressure in a first confined zone;
 delivering a liquefied gas, constituting a gas that has been liquefied by compression and maintained a liquid during storage by its confinement in a pressure vessel, into a third confined zone, constituting a detaining and mixing chamber;
 delivering at least a major portion of said hot gases from said first confined zone directly into said third confined zone, for mixing with said liquefied gas;
 delaying such flowing fluids in said third confined zone a sufficient length of time to allow the said hot gases to vaporize substantially all of the liquefied gas in such third zone;
 introducing such resulting gaseous mixture into a gas confining type inflatable object; and
 controlling the hot gas generation rate and the delivery rate of the liquefied gas to that of the gaseous mixture in the inflatable object is approximately at ambient temperature.

7. The method of claim 6, wherein said liquefied gas at least principally comprises a fluorinated hydrocarbon type refrigerant.

8. The method of claim 6, further comprising rapidly pumping said liquefied gas from said pressure vessel by delivering a portion of said hot gases into said pressure vessel, generally at an upper level of said liquefied gas, and using it to pressure feed said liquefied gas, as a liquid from a lower level, into said detaining and mixing chamber continuously during the mixing operation.

9. The method of claim 8, comprising controlling the pumping rate of the liquefied gas, and the flow rate, the temperature, and the pressure of the resulting fluid mixture, solely by controlling the hot gas generation rate.

10. The method of claim 9, comprising generating said hot gases under pressure by burning a solid fuel grain, and comprising controlling the hot gas generation rate by constructing said grain to expose a predetermined area of burning surface during each stage of combustion.

11. The method of claim 6, including progressively increasing the hot gas generation rate and in that manner its delivery rate, and progressively increasing the delivery rate of the liquefied gas, to progressively increase the flow rate and pressure of the fluid mixture.

12. The method of claim 11, comprising generating said hot gases under pressure by burning a solid fuel grain, and progressively increasing the hot gas generation rate of said grain by preconstructing the grain to expose a progressively larger burning surface as combustion proceeds.

13. The method of claim 6, including forming the fluid mixture into a stream and entraining ambient air into said stream, and then delivering the resulting mixture into the inflatable object.

14. The method of claim 13, including controlling the delivery rate of the liquefied gas, and the flow rate of the formed stream, and thus the entrainment rate of the ambient air, solely by controlling the hot gas generation rate, and in that manner the delivery rate, of the hot gases.

15. The method of claim 14, wherein said fuel is a solid fuel grain, and comprising progressively increasing the hot gas generation rate by constructing the grain to progressively expose a larger burning surface as combustion proceeds.

16. The method of rapidly vaporizing a pressure liquefied gas to produce a non-toxic gaseous working fluid, said method comprising, substantially concurrently:
generating hot gases under pressure by burning an ammonium nitrate solid fuel grain in a first confined zone;
delivering a pressure liquefied gas, which at least principally comprises a fluorinated hydrocarbon type refrigerant, in liquid state from a second confined zone, constituting a pressure vessel type storage chamber for such liquefied gas, into a third confined zone, constituting a detaining and mixing chamber;
delivering at least most of said hot gases from said first confined zone directly into said third confined zone, for flow-through type mixing therein with said liquefied gas;
delaying such flowing fluids in said third confined zone a sufficient length of time to allow the said hot gases to vaporize substantially all of the liquefied gas in said third zone;
forming the resulting gaseous mixture into a stream; and
delivering such stream to a utilization device.

17. The method of pumping a pressure liquefied gas from a pressure vessel type storage chamber and then rapidly vaporizing it to produce a gas, said gas being of a type that is in stable gaseous form under the ambient temperature and pressure conditions at the use site, and said method comprising, substantially concurrently;
rapidly generating hot gases under pressure;
delivering a portion of said hot gases into said storage chamber, to pressure feed the liquefied gas, as a liquid from such storage chamber into a separate vaporization zone;
delivering most of said hot gases into heat exchange relationship with the liquefied gas within such vaporization zone and cause vaporization of substantially all of the liquefied gas in such vaporization zone and forming a gaseous effluent therefrom which is predominantly vaporized liquefied gas; and
delivering the gaseous effluent to a point of utilization subject to said ambient temperature and pressure conditions.

18. The method of claim 17, including progressively increasing the hot gas generation rate and in that manner its delivery rate, and controlling the delivery rate of the liquid, to progressively increase the flow rate of the gaseous effluent.

19. The method of claim 18, comprising generating said hot gases under pressure by burning a solid fuel grain, and progressively increasing the hot gas generation rate of said grain by preconstructing the grain to expose a progressively larger burning surface as combustion proceeds.

20. The method of claim 19, further comprising forming said gaseous effluent into a stream and entraining ambient air into said stream, and then delivering the resulting mixture to the point of utilization.

21. The method of claim 20, including controlling the generation rate of the hot gases, and in that manner the delivery rate of hot gases, and controlling the delivery rate of the liquid, to in turn control the amount of liquid vaporized, and the flow rate and flow characteristics of the formed stream, and thus the entrainment rate of the ambient air.

22. The method of claim 21, wherein said fuel is a solid fuel grain, and comprising progressively increasing the hot gas generation rate by constructing the grain to progressively expose a larger burning surface as combustion proceeds.

23. An inflation gas generator comprising:
a detaining and mixing chamber including an entrance portion;
a hot gas generating chamber including an outlet;
a pressure vessel type storage chamber containing a pressure liquefied gas;
means defining a liquefied gas passageway leading from said storage chamber to the entrance portion of said detaining and mixing chamber;
means defining a hot gas passageway leading from the outlet passageway of said gas generating chamber to an entrance portion of said detaining and mixing chamber;
outlet passageway means leading from said detaining and mixing chamber to a gas confining type inflatable object; and
feed means for delivering liquefied gas from said storage chamber in liquid form through said liquefied gas passageway at a rate resulting in vaporization of substantially all of said liquefied gas in said detaining and mixing chamber and delivery of the gaseous effluent to said outlet passageway means, and thence to the inflatable object, the gaseous effluent in the inflatable object being at approximately ambient temperature.

24. An inflation gas generator according to claim 23, wherein said hot gas passageway includes a venturi upstream of the mixing chamber and the liquefied gas passageway communicates with said hot gas passageway downstream of said venturi, so that the hot gases flowing through the venturi aspirate said liquefied gas from its storage chamber.

25. The inflation gas generator of claim 23, further comprising ambient air entraining jet pump means having a pumping fluid inlet, an ambient air inlet, and a combined gas outlet; means connecting said outlet passageway means to said pumping fluid inlet; and means for communicating the combined gas outlet of said jet pump with the interior of said inflatable object.

26. The inflation gas generator of claim 23, wherein said feed means includes means defining a second hot gas passageway means leading from the hot gas generating chamber into the liquefied gas storage chamber, for delivering hot gases thereinto, so as to positively pressurize but not vaporize the liquefied gas while it is in said storage chamber, and to pressure feed said liquefied gas from said storage chamber into the detaining and mixing chamber.

27. The inflation gas generator of claim 26, wherein the outlet for the hot gas generating chamber includes a metering orifice, and wherein said second hot gas passageway means extends directly from the hot gas generating chamber from a location spaced inwardly of said orifice, so that the hot gas generating chamber pressure is delivered into the liquefied gas storage chamber.

28. The inflation gas generator of claim 23, wherein the hot gas generating chamber contains an ammonium nitrate solid fuel grain, and includes an initiator for such grain, and wherein said liquefied gas at least principally comprises a fluorinated hydrocarbon type refrigerant.

29. The inflation gas generator of claim 28, wherein said fuel grain is constructed to produce a progressive increase in the quality of hot gases generated as combustion proceeds.

30. The inflation gas generator of claim 28, wherein the hot gas generating chamber and its outlet passageway, the storage chamber, the hot gas passageways, the liquid passageway, and the detaining and mixing chamber and its inlet and outlet, are all of fixed size, and wherein said solid fuel grain is constructed to burn at a predetermined rate, and is determinant of the pumping and vaporization rate of said liquid gas, and in turn the pressure and flow rate of the fluid discharged from said outlet passageway means.

31. An inflation gas generator according to claim 23, wherein said hot gas generating chamber is housed within a first casing, a second and larger casing surrounds said first casing, and at least a portion of the space formed between the two casings constitutes the storage chamber for said liquefied gas, wherein said liquefied gas passageway leads from a lower portion of said storage chamber to said detaining and mixing chamber, and wherein said delivery means comprises passageway means for delivering a portion of the hot gases to an upper portion of said storage chamber, to pressure feed the liquefied gas from said chamber, through the liquefied gas passageway, and into said mixing chamber.

32. An inflation gas generator according to claim 31, wherein said hot gas passageway includes a venturi upstream of the mixing chamber and the liquefied gas passageway communicates with said hot gas passageway downstream of said venturi, so that the hot gases flowing through the venturi aspirate said liquefied gas from its storage chamber.

33. The inflation gas generator of claim 31, wherein said liquefied gas at least principally comprises a fluorinated hydrocarbon type refrigerant.

34. The inflation gas generator of claim 33, wherein the hot gas generating chamber contains an ammonium nitrate type solid fuel grain, and includes an initiator for such grain.

35. The inflation gas generator of claim 34 further comprising ambient air entraining jet pump means having a pumping fluid inlet, an ambient air inlet, and a combined gas outlet; means connecting said outlet passageway means to said pumping fluid inlet; and means for communicating the combined gas outlet of said jet pump with the interior of said inflatable object.

36. A cool gas generator comprising:
a hot gas and cold liquefied gas detaining and mixing chamber including an entrance portion;
storage means containing a liquefied gas;
means defining a liquefied gas passageway leading from said storage chamber to the entrance portion of said detaining and mixing chamber;
a hot gas generating chamber including an outlet;
means defining a hot gas passageway leading from the outlet of said gas generating chamber to the entrance portion of said detaining and mixing chamber;
means for feeding said liquefied gas in liquid form from said storage means through said liquefied gas passageway into said detaining and mixing chamber;
outlet passageway means for said gaseous mixture leading from said fluid detaining and mixing chamber to a utilization device; and
heater means for preheating both the hot gas generating chamber and the liquid, to raise them in temperature to a predetermined value above ambient temperature prior to initiation of the generator.

37. A cool gas generator comprising:
a detaining and mixing chamber including an entrance portion and flow restricting means;
a hot gas generating chamber including outlet passageway means opening into the entrance portion of said detaining and mixing chamber, for delivering a first stream of hot gases into said detaining and mixing chamber;
a pressure vessel type storage chamber containing a pressure liquefied gas;
means defining a liquefied gas passageway leading from said storage chamber to the entrance portion of said detaining and mixing chamber;
additional passageway means for delivering a smaller second stream of generated hot gases into the liquefied gas storage chamber, to positively pressurize but not vaporize the liquefied gas while it is in said storage chamber, and to pressure feed said liquefied gas as a flowing liquid from said storage chamber into the detaining and mixing chamber, for thorough mixing therein with and vaporization therein by said first stream of hot gases, with said second stream of hot gases continuously flowing through said additional passageway means and into said storage chamber, for pressure feeding the liquefied gas throughout substantially the entire period of delivery of hot gases and liquefied gas into the mixing chamber;
pressure responsive closure means for the outlet passageway of said hot gas generator, functioning to maintain said outlet passageway closed and the hot gases within the hot gas generating chamber until a predetermined pressure has built up in the hot gas generating chamber by reason of confinement of the hot gases therein, and thereafter opening and permitting controlled flow of the hot gases into the mixing chamber;
closure means for initially preventing flow through the detaining and mixing chamber and out of the generator until the pressure in said storage chamber is sufficiently high to flow as a liquid out of said chamber at a desired predetermined rate; and
outlet passageway means leading from said detaining and mixing chamber to a utilization device.

References Cited

UNITED STATES PATENTS

| | | | |
|---|---|---|---|
| 3,163,014 | 12/1964 | Wismar | 62—48 |
| 3,182,554 | 5/1965 | Barakauskas | 89—1.81 |
| 3,298,278 | 1/1967 | Barakauskas | 89—1.8 |
| 2,943,459 | 7/1960 | Rind | 62—52 X |
| 2,958,204 | 11/1960 | Spaulding | 62—52 X |
| 3,031,857 | 5/1962 | Walbaum | 62—52 |
| 3,091,096 | 5/1963 | Rendos et al. | 62—52 |
| 3,127,743 | 4/1964 | Kern | 158—50.1 |
| 3,183,678 | 5/1965 | Hosford | 62—52 |

LLOYD L. KING, *Primary Examiner.*

U.S. Cl. X.R.

60—39.48